(12) United States Patent  
Eisenberg et al.

(10) Patent No.: US 7,273,176 B2  
(45) Date of Patent: Sep. 25, 2007

(54) ELECTRO-OPTIC READER FOR RETRO-REFLECTIVE BAR CODES

(75) Inventors: Naftali P. Eisenberg, Jerusalem (IL); Avishai H. Drori, Jerusalem (IL)

(73) Assignee: Optid, Optical Identification Technologies Ltd., Jerusalem (IL)

( * ) Notice: Subject to any disclaimer, the term of this patent is extended or adjusted under 35 U.S.C. 154(b) by 89 days.

(21) Appl. No.: 10/486,992

(22) PCT Filed: Aug. 16, 2001

(86) PCT No.: PCT/IL01/00777

§ 371 (c)(1),  
(2), (4) Date: Feb. 17, 2004

(87) PCT Pub. No.: WO03/017193

PCT Pub. Date: Feb. 27, 2003

(65) Prior Publication Data

US 2004/0211837 A1    Oct. 28, 2004

(51) Int. Cl.  
*G06K 7/10*    (2006.01)

(52) U.S. Cl. .................... 235/462.01; 235/462.06; 235/462.42; 235/436

(58) Field of Classification Search ......... 235/462.01, 235/462.06, 462.41, 462.42, 494, 436  
See application file for complete search history.

(56) References Cited

U.S. PATENT DOCUMENTS

| | | |
|---|---|---|
| 2,380,447 A | 7/1945 | Jungersen |
| 3,712,706 A | 1/1973 | Stamm |
| 4,066,873 A | 1/1978 | Schatz |
| 4,175,775 A | 11/1979 | Kruegle |
| 5,171,624 A | 12/1992 | Walter |
| 5,204,675 A | 4/1993 | Sekine |
| 5,237,164 A | 8/1993 | Takada |
| 5,451,758 A | 9/1995 | Jesadanont |
| 5,504,319 A * | 4/1996 | Li et al. ............. 235/462.08 |
| 5,742,411 A | 4/1998 | Walters |
| 5,872,354 A * | 2/1999 | Hanson ............. 235/462.24 |
| 5,915,032 A | 6/1999 | Look |
| 6,015,214 A | 1/2000 | Heenan et al. |
| 6,024,455 A | 2/2000 | O'Neill et al. |
| 6,120,882 A | 9/2000 | Faykish et al. |
| 6,832,728 B2 * | 12/2004 | Kennedy ............. 235/468 |

FOREIGN PATENT DOCUMENTS

GB    2 248 994    4/1992

(Continued)

OTHER PUBLICATIONS

Accu-Sort® Systems Inc.; "Auto-ID/24—Accu-Sort's new Auto ID/24 for Vehicle Identification;" Retrieved from Internet: <http://www.accusort.com/products/autoid24.html> [Retrieved on Jun. 20, 2001;] pp. 1-2.

(Continued)

*Primary Examiner*—Seung Ho Lee

(57) ABSTRACT

A system for identification comprising: a surface (14) comprising retro-reflective indicta; a source of light that illuminates the indicta (18) along an illumination direction; and a detector (20, 21) that views light reflected from the indicta, wherein the retro-reflector reflects the light that illuminates it as a plurality of beams at a plurality of angles relative to the illumination direction.

36 Claims, 12 Drawing Sheets

FOREIGN PATENT DOCUMENTS

| WO | WO99/15920 | 4/1999 |
| WO | WO99/36836 | 7/1999 |

OTHER PUBLICATIONS

Amtel; "Access Control, Security Systems and Parking Controls;" Retrieved from Internet: <http://www.amtel-security.com/Home/1st%20page%20content.html> [Retrieved on Jun. 20, 2001;] pp. 1-2.

Barcode Automation Inc.; "Laser Barcode Readers and Labels for Vehicle Access Control & Identification;" Retrieved from Internet: <http://www.barcode-automation.com/> [Retrieved on Jun. 18, 2001;] p. 1.

Chang, R. F. et al.; " Far-Field Diffraction Pattern for Corner Reflectors with Complex Reflection Coefficients;" Apr. 1971; Journal of Optical Society of America; vol. 61, No. 4; pp. 431-438.

Kennedy, J.; "License Plate Capture Systems and the Application of Infrared Ilumination;" Pearpoint, Inc.; California, USA; pp. 1-3.

Pearpoint, Inc.; "Single Package Incorporating IR Illumination and Sensor . . . ;" pp. 1-2.

Yoder, Jr., P. R.; "Study of Light Deviation Errors in Triple Mirrors and Tetrahedral Prisms;" Jul. 1958; Journal of the Optical Society of America; vol. 48, No. 7; pp. 496-499.

* cited by examiner

ELECTRO-OPTIC READER FOR RETRO-REFLECTIVE BAR CODES

RELATED APPLICATIONS

The present application is a U.S. national application of PCT Application No. PCT/IL01/00777, filed on Aug. 16, 2001.

FIELD OF THE INVENTION

The invention relates to the field of electro-optic readers and cards and in particular to readers, cards labels or other marked surfaces and algorithms suitable for electro-optic reading of cards labels or other marked surfaces at relatively long distances.

BACKGROUND OF THE INVENTION

Optical Remote reading of cards, for example for identification, is well known. In general, such cards contain a bar code, such as a code 39, which is read by a remote scanner. Reading at distances of several feet is possible but not easy in many applications. In general, cards containing a bar code are placed in a side window of a vehicle and a scanner placed at the side of a road on which the vehicle travels are used to identify cars, for example at a gate. Since the position of the cards can be controlled (the card is placed at a height at which it always can be read) and the aspect of the card is almost normal to the scanner, such reading can be fairly successful.

The prior art does not read cards placed in the front window of a car, for at least four reasons. One reason is that the position, tilt and aspect (angle of incident light with respect to normal) of the card are less controllable. The second reason is that the use of a laser scanner that points at a drivers eyes, even one in the infrared, is not considered safe. A third reason is that such scanners, especially for measurement at a distance, are expensive. A fourth reason is that there are often stickers or other devices on the windshield of a vehicle, which may be mistaken by a reader for the card to be read.

Flat Retro-reflective sheets are well known. Such reflectors may be of the type utilizing arrays of micro-elements, such as corner reflectors or of the type using beads or other cats-eye type structures to return the light. In general, the acceptance angle (the range of incident angles at which incoming light is retro-reflected) is dependent on the retro-reflector type used. Retro-reflectors are generally imperfect and have a, generally small, spread of angles around the retro angle at which the light is reflected.

Labels utilizing retro-reflector enhanced indicia have been used for providing improved readability of the indicia, for example of indicia placed over them. When the indicia are illuminated, the retro-reflectors selectively reflect the light in the direction of the light source, thereby providing a bright background for the indicia and increased contrast. The prior art also shows the use of colored indicia and the generation of retro-reflector enhanced indicia generated by providing areas of retro-reflectors in the form of an image that is retro-reflected. The indicia/retro-reflectors may be overlayed by other indicia (holograms and engraved patterns are suggested in the art), and/or by coatings that reflect or absorb light at certain wavelengths.

Directed reflectors are also known. A directed reflector is a reflector that reflects incident light at an angle that is offset by a fixed amount from the angle of incidence. One method of generating directed reflectors is by utilizing corner reflectors with faces that are not perpendicular. Reference is made in this regard to "Study of Light Deviation Errors in Triple Mirrors and Tetrahedral Prisms", Yonder, J., JOSA, V. 48 (7) 1958.

SUMMARY OF THE INVENTION

A broad aspect of some embodiments of the invention is concerned with a remote card reading system.

In some embodiments of the invention, a card or other surface having retro-reflecting enhanced indicia, such as a card marked with indicia overlaying a retro-reflector, is used. In an embodiment of the invention, the retro-reflector reflects the light in directions around a central axis equal to the incident axis of the light. However, the light is reflected in a cone-like cross-section in which the intensity of light reflected along the axis is lower than the intensity reflected at some (peak) design angle $\alpha$ from the axis. The term "circular offset angle" is used herein for the angle $\alpha$.

In some embodiments of the invention, a camera views the card. The card is placed at a distance from the source and camera such that the camera views a retro-reflection enhanced image of the indicia at the circular offset angle $\alpha$. In this situation, the orientation of the card is not critical, within the acceptance angle of the retro-reflector, since the high intensity lobe of the reflection is at the same angle, independent of the orientation of the retro-reflected indicia. Optionally, a second camera is placed at an angle at which the retro-reflection is small. This allows for the screening and rejection of cards that do not have the indicated angular deviation of retro-reflection. Alternatively or additionally, a first image is acquired by the camera at a first distance at which the camera should be able to acquire a retro-reflected image. A second image is acquired at a closer distance at which the retro-reflected light should be absent. Only cards that give an image at the proper distance are verified. The distance may be measured directly, as by a 3D camera or range finder, or indirectly, as by a presence sensor in the road for a vehicle that carries the card. Alternatively or additionally, the card may be fitted with two or more types of retro-reflectors, each having a different offset angle. Strategically placed cameras or acquisition distances can provide the same safety features described above.

In some embodiments of the invention further security may be added by utilizing one or more of (1) analysis of a diffraction pattern of the retro-reflectors, (2) providing different retro-reflective contrast over portions of the card, (3) optical coatings that cause spectrum differences for various portions of the card, (4) detection of a reflection pattern of the retro-reflector or (5) asymmetrical retro-reflectance. Other security measures, known in the field of credit and identification cards can also be used.

It is a feature, of some embodiments of the invention, that bar codes can be read at distances of 8, 10, 12 or more meters utilizing a CCD camera and incoherent pulsed (or continuous) IR (or visible) illumination, day or night.

An aspect of the invention is concerned with the design of a card or other surface for identification or recognition purposes.

In an embodiment of the invention, the card comprises retro-reflection enhanced indicia. These indicia can be formed by providing indicia over a retro-reflecting surface. Alternatively or additionally, only a portion of the surface may be provided with a retro-reflective surface, such that the retro-reflected light forms an image. Alternatively or additionally, the contrast between different portions of the image may be varied, as for example by coating a portion with a partially absorbing surface or by providing retro-reflective elements having different efficiencies over various portions of the surface or by damaging portions of the retro-reflective element. Alternatively, only portions of the retro-reflector indentations are coated to alter their reflectivity. In an embodiment of the invention, a first set of indicta (for example a bar code) is formed over a retro-reflecting surface. The retro-reflecting surface is divided into various sections that have different retro-reflectivities. These sections may form a pattern that provides an additional form or security confirmation.

In some embodiments of the invention, the indicta on the card are of the form described below with respect to an optional optimized code of the invention.

In some embodiments of the invention, the card is provided with a printed layer containing the normal identification information that one finds on credit cards or passes. The retro-reflective indicta are under this layer. The printed layer is preferably substantially transparent to the light used to interrogate the retro-reflective indicta.

An aspect of the invention is concerned with the design of a bar code especially suitable for use with remote reading by a camera and with a methodology of reading bar codes, especially suited for reading said codes at a distance by imaging of the bar code.

As a preliminary matter, it should be noted that for capture of bar code information from a card, placed, for example, in the windshield of an automobile, an image of a large area is captured. For a standard 780×580 CCD detector, if 8 code 39 characters are utilized, in a stacked configuration, on a standard credit card size substrate, the narrow elements in the bar code will be between 2 and 3 pixels wide, when acquired at 8-12 meters. Since the card forms only a relatively small part of the acquired image, it is preferable to identify the card on the image and perform image processing only on the portion of the image containing the card. It is also possible that the card may be upside down or sideways. Under field conditions it is possible that part of the substrate may be obscured. However, cards can be decoded even when the distance is as large as 20 meters. It is understood that the use of higher resolution cameras such as 1024×1024 or 2048×2048 cameras gives a higher resolution and can result in a higher range of detection.

In the standard code 39 bar code, the number of different characters is limited to 43 specific variations of the bar combinations. This limitation is imposed to reduce the ambiguity between similar character configurations. In some embodiments of the invention an extended variant of the "code 39" bar code is used. In this extension, the number of characters is higher than the normal number. For example, for the code 39 structure, 84 combinations are possible and may be used. For access cards, for which the number of required codes is not high, it may be more desirable to have redundancy rather than total lack of ambiguity. For example if six characters are available, use of the standard 39 bar code, with 43 variations give $(43)^6$=6.3 billion combinations. The use of the variant bar code using a full number of possible combinations with triple redundancy gives $(84)^2$=7056 combinations. For double redundancy, the number of combinations is $(84)^3$=592,704. Although the number of variations is lower for the redundant methodology, the redundant scheme is sometimes more desirable under remote reading conditions, since there is a distinct possibility that one or more of the characters may be covered or otherwise unreadable. Furthermore, for a moving vehicle, the system may only be able to acquire a limited number of images while the card is in range. In some embodiments of the invention, deblurring algorithms, as known in the art, may be used.

In some embodiments of the invention, the code is formed as a series of stacked rows of characters. In order to allow for at least a 2 pixel width for a narrow line element, the number of characters per row (on a card) is limited to two characters, when the row is parallel to the long side of the card. From signal to noise and size considerations, the total number of rows is sometimes limited to 4 or 5, resulting in 8 characters per card (for 4 rows). Since account must be taken of the conditions under which the card is read, it generally preferred to provide a check-sum character and preferably two check sum characters. This allows for 6 data characters, with either two (three characters) or three (two characters) fold redundancy. If all eight characters are used for data, the possibilities are two (four characters) or four (two characters) fold redundancy. Other codes, may be used in some embodiments of the invention.

Another type of redundancy which may be utilized is having the second appearance of the code not be an exact copy of the first appearance of the code. Each of the characters in the second appearance of the code may be a function of two or more characters in the original code. Other redundancy schemes, known in the art, may also be used.

In standard code 39 bar code systems, a special character is used to indicate the start and end of a row or other grouping of characters or a row. Since, for long distance viewing, the elements of the characters must be larger than for near viewing, the number of characters available per unit area is severely reduced. The use of two characters out of 8 to indicate start and stop would be very wasteful. Nevertheless, it is necessary to indicate the start of the character string and the orientation (up, down or rotated) of the card on the image.

In some embodiments of the invention, the card, or the area containing the indicta, is formed with a highly reflecting edge. Since the card is rectangular, the provision of such an edge allows for the determination of orientation of the card. Additionally, in some embodiments of the invention, a black (non-retro-reflecting) border is placed around the outside of the reflecting border. This allows for better visualization of the border. In some embodiments of the invention, a determination of the size of the border is made. This allows for a first order size determination of the expected size of wide and narrow lines and may make the differentiation between them easier.

In some embodiments of the invention, where stacked bar codes (at least three) are used the spacing between the rows is different so that the top row can be distinguished from the bottom row. Either one of the spaces between the end and an interior row or one of the end rows and the border (works even with only two rows) or between two of the interior (but not the middle) rows can be made different from the width of the other corresponding space. Alternatively, the spacing between characters can be different between the top and bottom rows, with a short space being used in one and a long space in the other.

An aspect of some embodiments of the invention is concerned with authentication methods. Some of these methods are useful for short range interrogation of the cards.

In accordance with some embodiments, a retro-reflecting surface is illuminated by a light source. A detector views the reflected light from the direction of incidence of light from the source. An image, corresponding to the reflections from the retro-reflector, is formed on the detector. In some embodiments a laser source is used. In others a LED or other incoherent source is used.

There is thus provided, in accordance with an embodiment of the invention, a system for identification comprising:

a surface comprising retro-reflective indicia;
a source of light that illuminates the indicia along an illumination direction; and
a detector that views light reflected from the indicia,
wherein the retro-reflector reflects the light that illuminates it as a plurality of beams at a plurality of angles relative to the illumination direction.

Optionally, where the plurality of beams are produced in pairs, the members of the pair lie in a plane and make the same angle with the incident direction, with an opposite sign. Optionally, the plurality of beams lie on the surface of a circular cone. Optionally, the plurality of beams lie on the surface of an elliptical cone. Optionally, the plurality of beams provide a substantially continuous ring of reflected light. Optionally, the ring of light has substantially of the same intensity along its length.

In an embodiment of the invention, the source and detector illuminate and view the surface at angles having a difference substantially equal to at least one of the multiple reflection angles. Optionally, the system includes at least one additional detector that views the surface at an angle substantially different from any of said multiple angles.

Optionally, the plurality of beams define the surface of two or more circular cones. Optionally, the plurality of beams lie on the surface of an elliptical cone. Optionally the plurality of beams provide a plurality of substantially continuous rings of reflected light. Optionally, each of the rings of light has substantially of the same intensity along its length.

In an embodiment of the invention, the source and detector illuminate and view the surface at angles having a difference substantially equal to at least one of the multiple reflection angles. Optionally, the system includes an additional detector said detector and said additional detector viewing said surface at an angle substantially equal to another of the multiple angles.

Optionally, the detector is an imaging detector, that forms an image of the light retro-reflected from the surface. Optionally the system includes an image processor that receives images formed on the detector. Optionally, the source of light does not scan the surface.

In an embodiment of the invention, the imaging detector images a field of view that has an area at least 5, 10, 20, 50 or 100 times as large as the area of the surface.

In an embodiment of the invention, the system includes image processing circuitry that detects the presence of the surface in an image acquired by the imaging detector.

In an embodiment of the invention, the retro-reflecting surface reflects light that forms an information carrying image and wherein the image processing circuitry is operative to extract the information from the image. Optionally, the information comprises a bar code. Optionally, the information comprises a two dimensional code. Optionally, the information comprises spectral information.

In an embodiment of the invention, the source of light illuminates the surface with incoherent light.

In an embodiment of the invention, the source and detector illuminate and view the surface at substantially the same angle. Optionally, the detector is an imaging detector.

Optionally, the image on the imaging detector comprises a pattern corresponding to the angles at which the light is reflected.

In an embodiment of the invention, the system includes authentication circuitry which authenticates the surface when the detector detects a predetermined pattern of light.

Optionally, the system includes a reflector that reflects the light reflected by the retro-reflector so that it can be viewed outside the path of illumination. Optionally the light source is an incoherent source. Optionally, the detector is situated at the plane of the source or at a virtual plane of the source or at an image of said source plane or virtual source plane.

Optionally, the light source produces a collimated beam of light. Optionally, the light source is a laser. Optionally, the detector views the light reflected by the retro-reflector without any focusing of the reflected light. Optionally, the system includes a focusing element, having a focal length, that receives the light reflected by the retro-reflector, wherein the detector is placed in the path of the thus reflected beam, spaced from the focusing element by a distance other than the focal length.

Optionally, the retro-reflecting surface is the surface of a relatively inflexible object. Alternatively, the surface is the surface of a flexible object. Optionally, the surface is the surface of a card. Optionally, the card has the size of a standard sized credit or smart card. Optionally, the object is a sticker.

There is further provided, in accordance with an embodiment of the invention a retro-reflective surface having information encoded thereon by having different areas thereof retro-reflecting with different retro-reflective intensities, to form indicia carrying the information, wherein the retro-reflector reflects the light that illuminates it as a plurality of beams at a plurality of angles to the illumination direction.

Optionally, the plurality of beams lie on the surface of a circular cone. Optionally, the plurality of beams lie on the surface of an elliptical cone. Optionally, the plurality of beams provide a substantially continuous ring of reflected light when illuminated by a beam of light. Optionally, the ring of light is substantially of the same intensity along its length.

In an embodiment of the invention, the plurality of beams are produced in pairs, the members of the pair lie in a plane and make the same angle with the incident direction, with an opposite sign.

In an embodiment of the invention, the indicta are situated in an information carrying portion of the surface and the information carrying portion is surrounded by a retro-reflecting border. Optionally, the retro-reflecting border is surrounded by a non-retro-reflecting border. Optionally, the non-retro-reflecting border is surrounded by a second retro-reflecting border.

Optionally, the information is comprised in a two-dimensional code. Optionally, the information is comprised in a bar code. Optionally, the bar code is a code 39 type code. Optionally, the bar code comprises a modified code in which more than 43 characters are available. Optionally, 84 characters are available. Optionally, at least some of the information appears more than once.

In an embodiment of the invention, the surface includes marlings indicating the orientation of the surface. Optionally, the orientation is indicated by the layout of the information carrying indicta.

In an embodiment of the invention, the said varying intensity of retro-reflection comprise of a retro-reflecting portion and a non-retro-reflecting portion.

Optionally, the plurality of beams define the surface of two or more circular cones. Optionally, the plurality of beams lie on the surface of an elliptical cone. Optionally, the plurality of beams provide a substantially continuous ring of reflected light. Optionally, the rings of light has substantially of the same intensity along its length.

Optionally, the retro-reflecting surface is the surface of a relatively inflexible object. Optionally, the surface is the surface of a flexible object. Optionally, the surface of a card. Optionally, the card has the size of a standard sized credit or smart card. Optionally, the object is a sticker.

There is further provided, in accordance with an embodiment of the invention, a method of reading a bar code comprising:

forming an image of a bar code with a camera from a distance of more than 10 meters; and determining the symbols represented by the bar code.

Optionally, the bar code is comprised in a retro-reflected image and including illuminating the bar code with light from a controlable light source.

Optionally, the retro-reflected image is reflected with a offset angle relative to the angle of incidence of the illumination from the light source. Optionally, the distance is more than 15, 20 or 25 meters.

In an embodiment of the invention, the bar code is formed on a credit card sized substrate. Optionally, the bar code includes at least 8 symbols.

BRIEF DESCRIPTION OF FIGURES

Exemplary, non-limiting embodiments of the invention are described in the following description, read in with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DESCRIPTION OF EXEMPLARY EMBODIMENTS

Overview of the System

Figure 1:
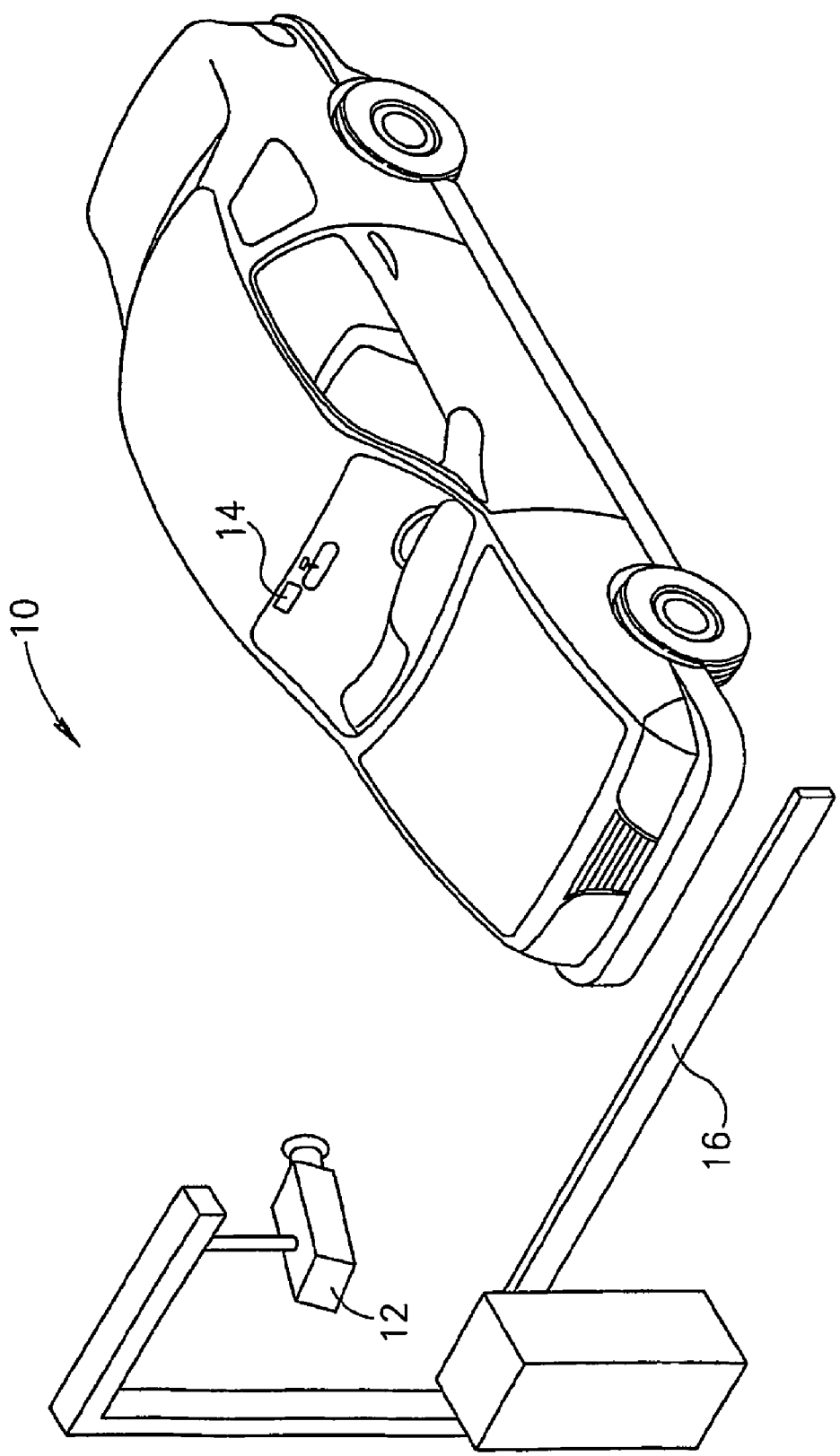
FIG. 1 is a schematic overview of an exemplary system for vehicle identification, in accordance with an embodiment of the invention.

FIG. 1 shows an overview of an exemplary vehicle identification system 10, in accordance with an exemplary embodiment of the invention. As shown, the system has two major subsystems, namely, an interrogating system 12 and an identification card 14. As a result of interrogating identification card 14, interrogating system 12 may cause a gate 16 to open or some other action to be performed.

Figure 2:
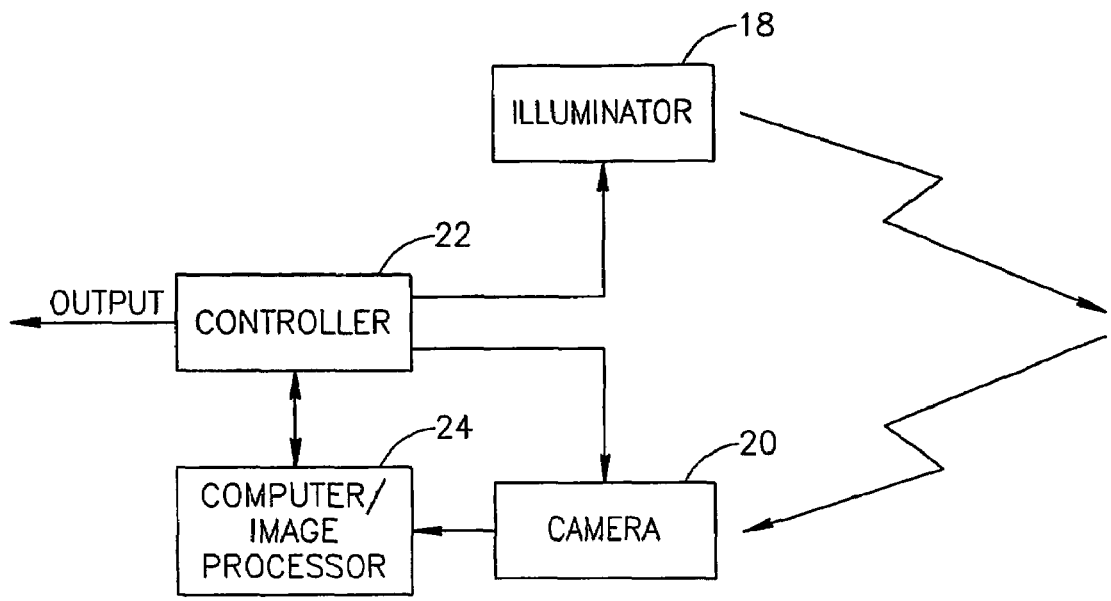
FIG. 2 is a schematic block diagram of an interrogation system, in accordance with an embodiment of the invention.

Before going on to the details of identification card 14 it is worthwhile to review the major parts of interrogating system 12, shown in FIG. 2. Interrogating system 12 includes, in many of its embodiments, an illuminator 18, a camera 20, a controller 22 and a computer/image processor 24. In some embodiments, computer/image processor 24 may be combined with controller 22 and/or camera 20, into a single unit. The functions described below with respect to computer image processor 24 and controller 22 may reside in at least in part in software, firmware or hardware, which may be dedicated hardware or a programmed general purpose computer or controller.

In operation, illuminator 18 produces light, which illuminates a vehicle (or other object) containing card 14 or any other surface having the information to be interrogated. Light reflected from card 14 is acquired by camera 20 and passed to computer/image processor 24 for processing to determine the information contained on the card. This information is passed to controller 22, which send a signal to operate gate 16 or to perform such other act as may be appropriate.

In an embodiment of the invention pulsed infrared (IR) light is produced by illuminator 18 and controller 22 controls and synchronizes the light production, shutter control of camera 20 and frame grabbing by computer image processor 24 to acquire the image produced by the flash. In an embodiment of the invention, the light is non-coherent, for increased safety. Alternatively, the lighting is continuous and shuttering is provided only by the camera.

Structure of an Exemplary Identification Card

Figure 3:
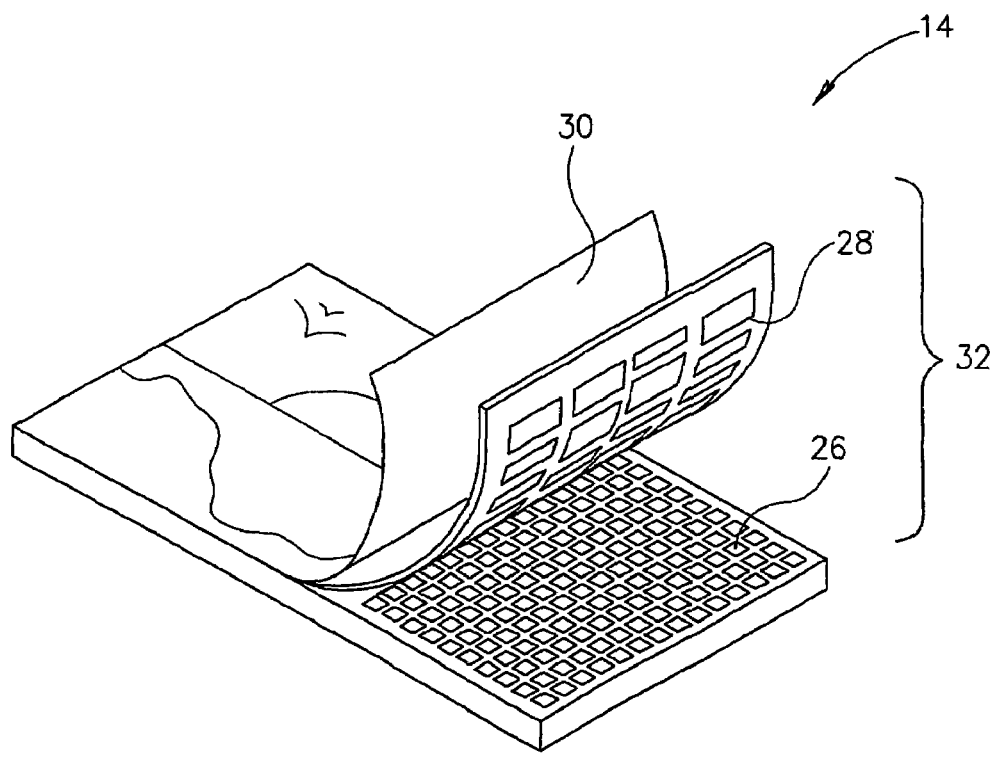
FIG. 3 is a schematic illustration of a card, in accordance with an embodiment of the invention.

FIG. 3 shows a very schematic version of a card 14, in accordance with an exemplary embodiment of the invention. In particular, card 14, as shown includes a base on which a retro-reflector 26 is formed, an indicta layer 28 and an optional overlay 30 overlaying the indicta layer. Retro-reflector 26 and indicta layer 28 together form retro-reflective indicta 32. It should be understood that retro-reflective indicta for use in the present invention can be formed in other ways, including without limitation, the formation of a pattern of retro-reflective areas separated by non-retro-reflective areas (optionally painted black). Furthermore, the retro-reflectors may be in the triangular configuration (which gives an efficiency of 66% reflection) or in a hexagonal configuration (which gives a 100% theoretical reflection). Both triangular and hexagonal configurations are known in the art. Preferably, the surfaces of the corners are coated to increase their reflection (for open air cube corner retro-reflectors).

In an embodiment of the invention, the retro-reflector is the back of a solid optical element in which a front, flat side is viewed. The back side is then coated with a reflector to form the retro-reflector. This provides for a retro-reflector having a higher acceptance angle. Alternatively or additionally, the indicta may be embedded in the optical element or formed in the reflectors to make the indicta more temper-proof.

In accordance with an embodiment of the invention, optional overlay 30 (and any information printed or otherwise formed on it) is transparent to the light produced by illuminator 18. Additionally, overlay 30 may be opaque to visible light (utilizing filters or other methods known in the art) so that the indicta can not be seen or read without proper illumination and instrumentation. Overlay 30 may be printed, for example, with identification information, with an image of the holder, with a hologram, with a magnetic stripe (although such a stripe is more conveniently placed on the back-not retro-reflective-side of the card) or with tamper resisting indicators, other security measurer or other indicta as are known in the art of identification cards.

In accordance with some embodiments of the invention, the retro-reflectors are configured such that the peak reflection is not directly in the direction of the incoming light. In some embodiments, the reflection peaks at a direction that is a substantially constant and small angle offset from the incident light direction. In accordance with an embodiment of the invention, the directions of peak reflection form the surface of a cone with a small apex angle having an axis along the direction of light incidence. Generally, the divergence spread around the circular offset angle is small.

Figure 4:
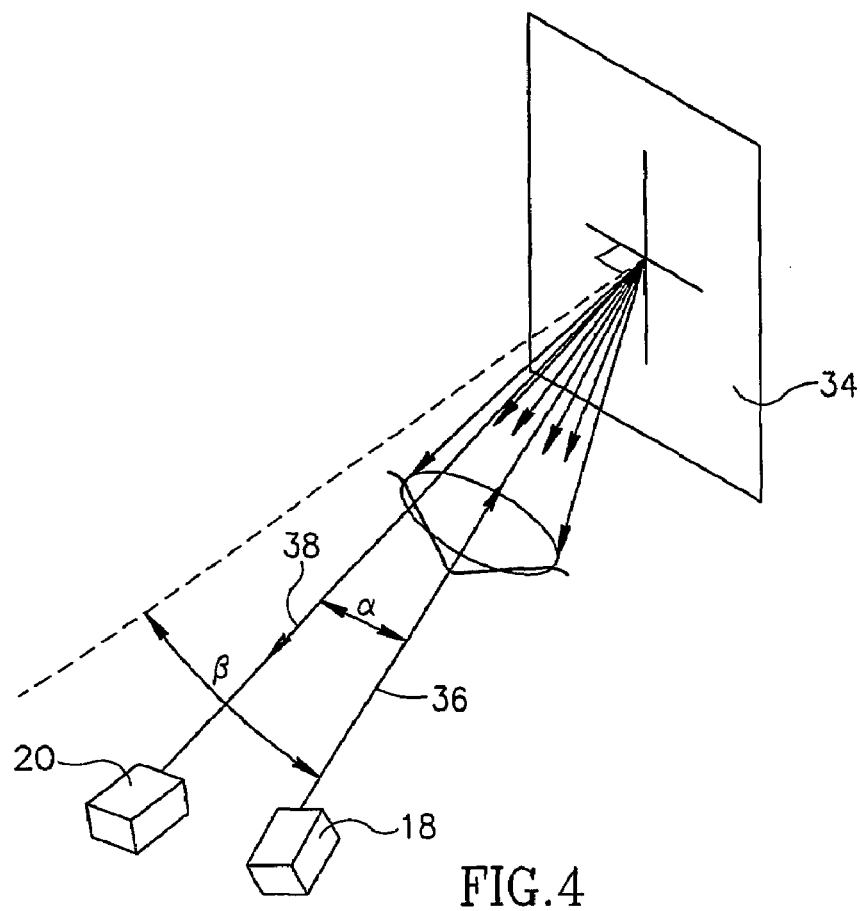
FIG. 4 is a schematic illustration of an interrogation system.

In most commonly used retro-reflectors, the reflection is not completely in the direction of incidence. Rather there is some divergence of the reflection in the form of a profile. FIG. 4 shows the use of a standard retro-reflector material in the manner of FIG. 2. Source 18 is incident along a line 36 on a retro-reflector 34 at an aspect angle $\beta$. Camera 20 is placed a small distance from the source (exaggerated for clarity), such that the angle between the incident direction 36 and a view direction 38 of camera 20 is $\alpha$. It is clear that for a high concentration retro-reflector, the beam is much attenuated at the camera, if it is placed at a view direction much greater than the divergence of the retro-reflector. On the other hand, if a high divergence retro-reflector is used, the energy reaching the camera at any position is low. Thus, in order to receive a reasonable intensity image at camera 20, high interrogating light intensity must be used.

Figure 5:
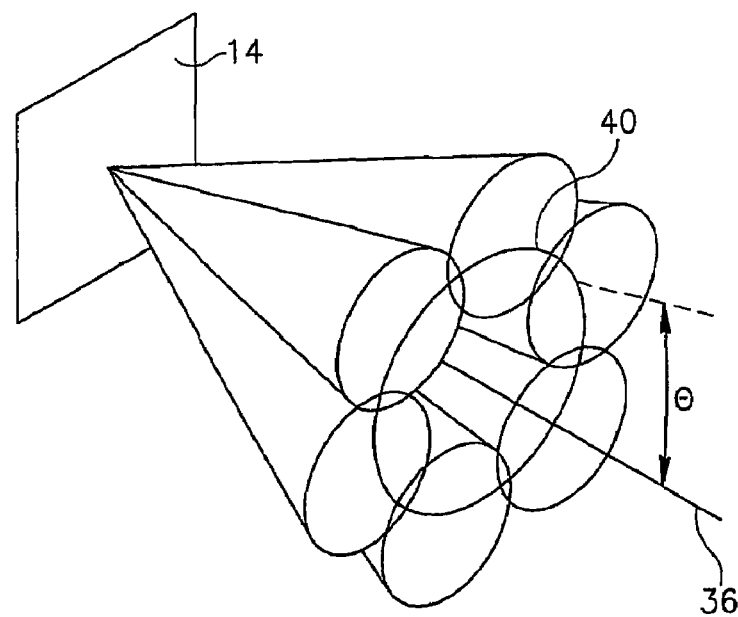
FIG. 5 shows a retro-reflection scheme, especially useful for carrying out the invention.

In accordance with an embodiment of the invention, as shown in FIG. 5, retro-reflector 14 is formed with a specific deviatIon to produce a plurality of beams that are reflected at a circular offiet angle along the sides of a cone. FIG. 5 shows a system in which six beams are reflected, with a deviation $\theta$ from the incident direction 36. The deviation of the reflected beams is small, but is preferably made large enough such that the intensity along the peak intensity line 40 is substantially constant.

Figure 6A:
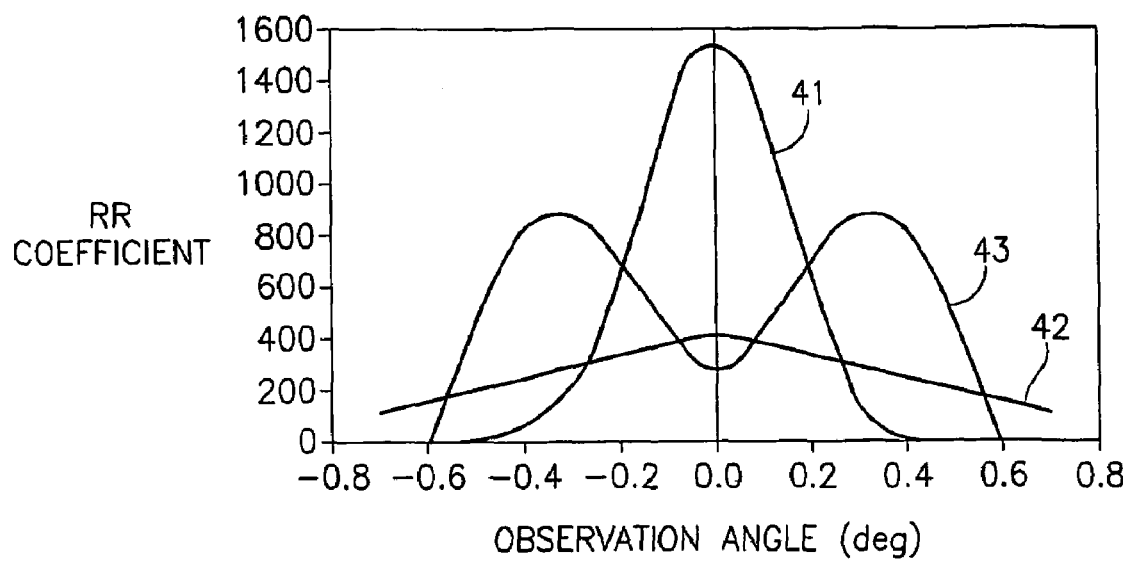
FIG. 6A is graph showing typical retro-reflection profiles of various designs of retro-reflectors.

FIG. 6A shows the angular intensity profile of three types of retro-reflectors. Line 41 is the reflection profile for a typical commercial cube-corner reflector. As shown, this device has a full width half maximum divergence angle of about 0.3°. Line 42 is the reflection profile for a typical bead-type retro-reflector (for example as used in a license plate). This shows a much higher divergence angle (about 0.8°, total). Commensurate with the wider divergence angle, the intensity in any direction is much lower. Line 43 shows a retro-reflector for use in the some embodiments of the present invention in which the peak of the reflection for each of the six reflected beams is at an angle of about 0.32°. The deviation about this angle is approximately the same as that for the commercial retro-reflector shown in the graph. This configuration gives approximately constant intensity at a deviation angle of 0.32°.

One way to achieve this conical profile, is to have the corner angles deviate slightly from 90°. The deviation (for small deviation angles) is approximately ⅓ the desired angular deviation for open air cubes. As seen in the graph, provision of a conical reflectance profile increases the intensity of light for a camera placed at the deviation angle of 0.32°.

As indicated, the provision of a substantially conical shape for the cross-section of the reflection profile results in a system in which the reflection to camera 20 is substantially independent of the aspect or tilt of the card with respect to the light source/camera. The extent of the incident angle which produces retro-reflection of the type described is, of course, limited. In order to increase this angle, the depressions forming the corner reflectors may be filled with a material having a high refractive index. (This material may also change the cone angle.) However, it should be noted that light incident on the outer surface of the material filling the depressions results in specular reflection, which reduces the intensity of the retro-reflected light.

Figure 6B:
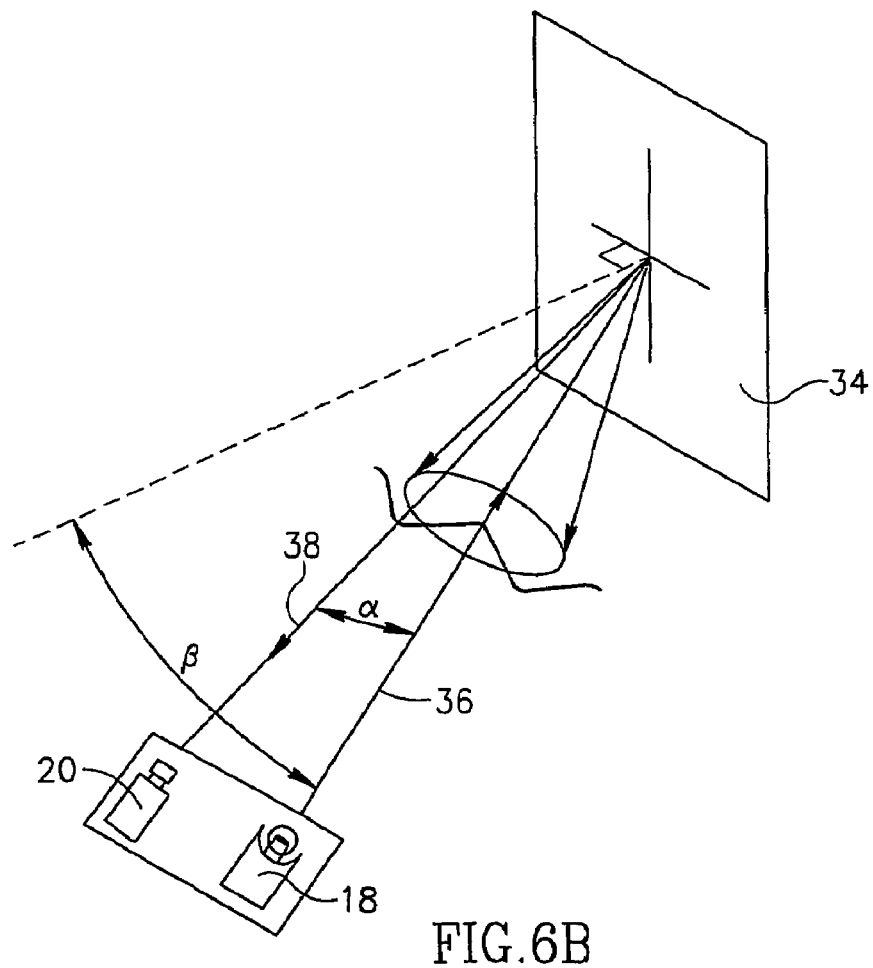
FIG. 6B is a schematic illustration of an interrogating system as used in an embodiment of the invention.

FIG. 6B shows a system similar to FIG. 4, except that it uses a retro-reflector with a cone angle of $\alpha$.

In the embodiment described above, the retro-reflection has a shape that is symmetrical about a retro-reflective axis. However, as described below, in some embodiments of the invention, the shape is not symmetrical with respect to the axis. For example, the shape can be elliptical or other shapes having a 180° rotational symmetry. A suggested utility of this type of reflection scheme is described below.

A holder, optionally a holder whose tilt and aspect is adjustable, is optionally provided to hold the card in the car or other vehicle's window. Since the positions and angles of dashboards and front windows are variable, it may be necessary to provide such holding and optional adjustment to avoid situations where the aspect of a card lying on the dashboard or stuck to the window is out of the acceptance angle of the retro-reflector.

Figure 7:
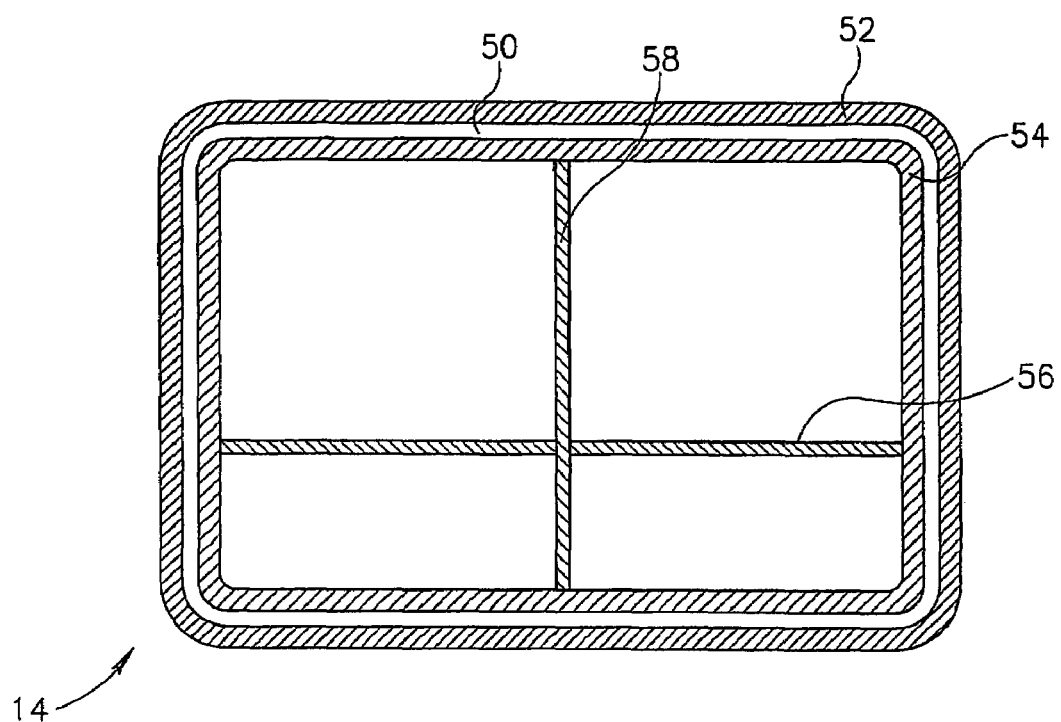
FIG. 7 shows various position/orientation/identification marks, in accordance with exemplary embodiments of the invention.

In accordance with an embodiment of the invention, as shown in FIG. 7, card 14 is provided with a border or other marking to make initial identification of the card (as described below) easier. In particular, the card may be provided with a retro-reflecting border 50. In some embodiments, retro-reflecting border 50 is surrounded by a black (non-retro-reflecting) border 52. In some embodiments, retro-reflecting border 50 surrounds a black (non-retro-reflecting) border 54. In some embodiments, both retro-reflecting borders are present. A rectangular border of predetermined ratio of height and width allows for secure identification of the card in an image, for determination of the tilt of the card (to within a half rotation) and allows for a rough calibration of the size of the card. As indicated below, this may allow for more definite determination of the size of the bars in a bar code. Alternatively or additionally, other markers may be present to provide for secure identification of the card. For example, a "black" stripe may be placed in the center of the card in either the horizontal (56) or vertical (58) direction, or both. If one of the stripes is off center, as shown, the tilt of the card can be determined.

Figure 8:
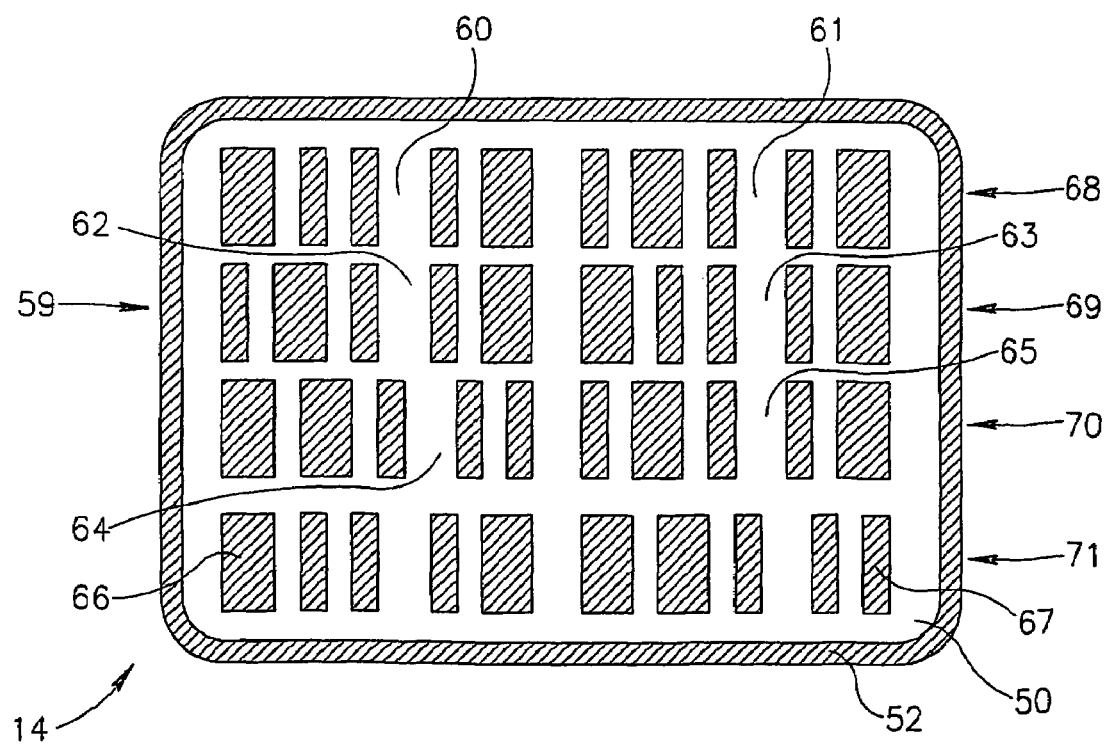
FIG. 8 shows a card layout in accordance with an embodiment of the invention.

In accordance with an embodiment of the invention, a code 39 bar code, in discrete symbol technology, is used as indicta. Alternatively, other symbol technologies can be used. FIG. 8 shows a card 14 having borders 50 and 52 and a bar code 59 containing eight characters 60-67 on four lines 68-71. In accordance with an embodiment of the invention, the space between lines 68/69 and 70/71 is made sufficiently different so that the difference is evident on an image acquired by camera 20. This allows for the removal of the 180° rotational ambiguity mentioned above. In addition, using the configuration show, no "start of scan" or "end of scan" characters are necessary. Although a code 39 bar code is shown, other bar codes or other indicta can be used.

It is noted that a modified bar code 39, shown in FIG. 8 contains two different characters that are each repeated three times (60, 63, 64 and 61, 62, 65) and a two check-sum character (66, 67). For the configuration shown, two repeats of three different characters (or three repeats of two different characters as shown) each with a duplicate check sum, are possible. If a higher resolution camera or shorter distances are used, smaller characters and a larger number of characters can be used, when the characters are repeated the modified code 39 can be used. Alternatively, if a larger number of combinations is desired, the standard code 39 can be used without repeats.

Details of an exemplary bar code scheme are given below.

In accordance with some embodiments of the invention, the card includes spectral indicta. For example, the retro-reflector (or a portion thereof) may be covered with a material that passes only a portion of the spectrum of the interrogating illumination. Alternatively, the indentations are lined with a metal or other material having particular spectral characteristics. In operation, the spectrum of the reflected light is measured and acts as a security measure for confirming the authenticity of the card, or for providing more bandwidth, namely N characters for each bandwidth.

In some embodiments of the invention, two types of retro-reflector elements are present on the surface of the card.

In an embodiment of the invention, a portion of the card comprises retro-reflecting elements that are close enough together to cause a diffraction pattern to be reflected. Camera 20, images the diffraction pattern. If the pattern meets a predetermined criteria, the card is considered to be genuine.

Figure 9A:
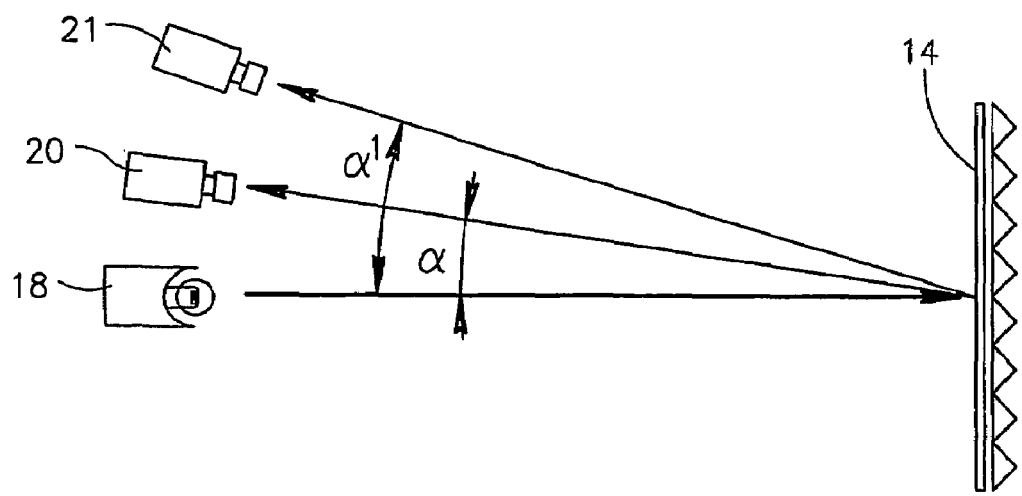
FIG. 9A is a schematic overview of an alternative exemplary system for secure vehicle identification, in accordance with an embodiment of the invention.

Alternatively or additionally, the two types of retro-reflecting elements have different cone angles $\alpha$ and $\alpha'$. As shown in FIG. 9A, two cameras 20 and 21' are provided, one at each of the cone angles. In one embodiment of the invention, the retro-reflecting elements are intermixed so that each portion of the image reflects light at two angles (albeit at a reduced intensity). The presence of both images, with predetermined intensity, acts as a check on the authenticity of the card. The images from the two images can be combined to provide for an additional security check, since the brightness (contrast) of the images should be about the same, while for a card without this feature, the intensifies are very different. Alternatively or additionally, a portion of the card retro-reflects with a cone angle different from that of another portion. Again, two cameras are provided for acquiring the images. The images are combined to provide a composite image from which the information can be extracted. The presence of both images also provides a confirmation of authenticity. In an embodiment of the invention, a border, as described above, is provided. This border may have both types of reflectors so that it is visible from the vantage of both cautieras. Alternatively, two borders, one with retro-reflection at each of the cone angles. are provided. Alternatively, only one type of reflector is present in the border end the position of the card is determined using only one of the images. Further processing of the image in the other image is based on the position determined in the first image.

Alternatively, a single camera can be used with combining optics utilized to combine both images onto a single camera.

Alternatively or additionally, each of the images can comprise a seemingly random dot pattern, while the combined images (e.g., added or subtracted) form an image.

Figure 9B:
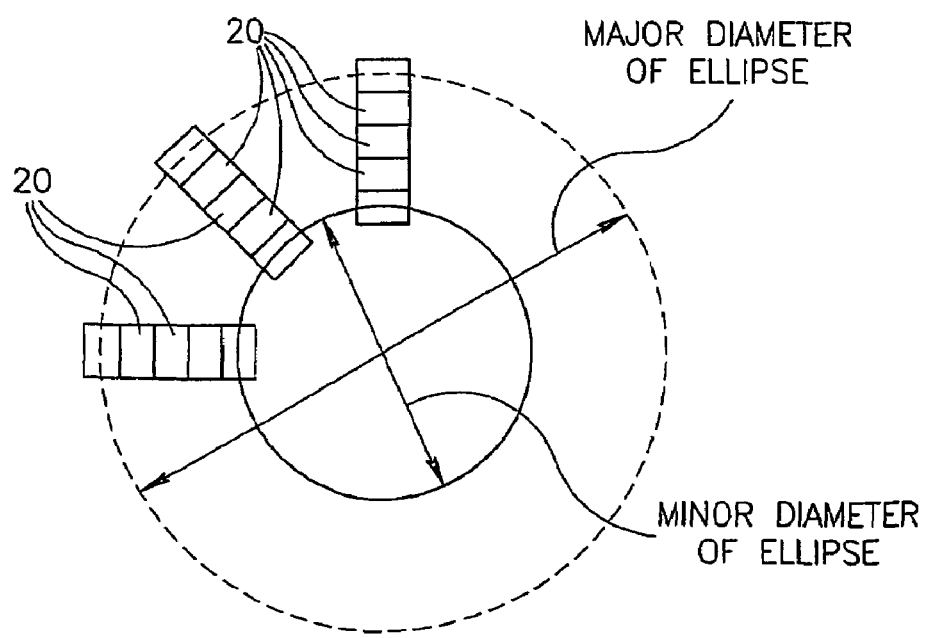
FIG. 9B is a schematic drawing illustrating an exemplary layout for multiple cameras, in accordance with an embodiment of the invention.

When an elliptical or other form for the cone is provided by the retro-reflectors (as described above), and two or more cameras are provided, for example utilizing the layout shown in FIG. 9B, the twist angle of the card can be determined. This too can act as a check on the authenticity of the card.

Figure 10A:
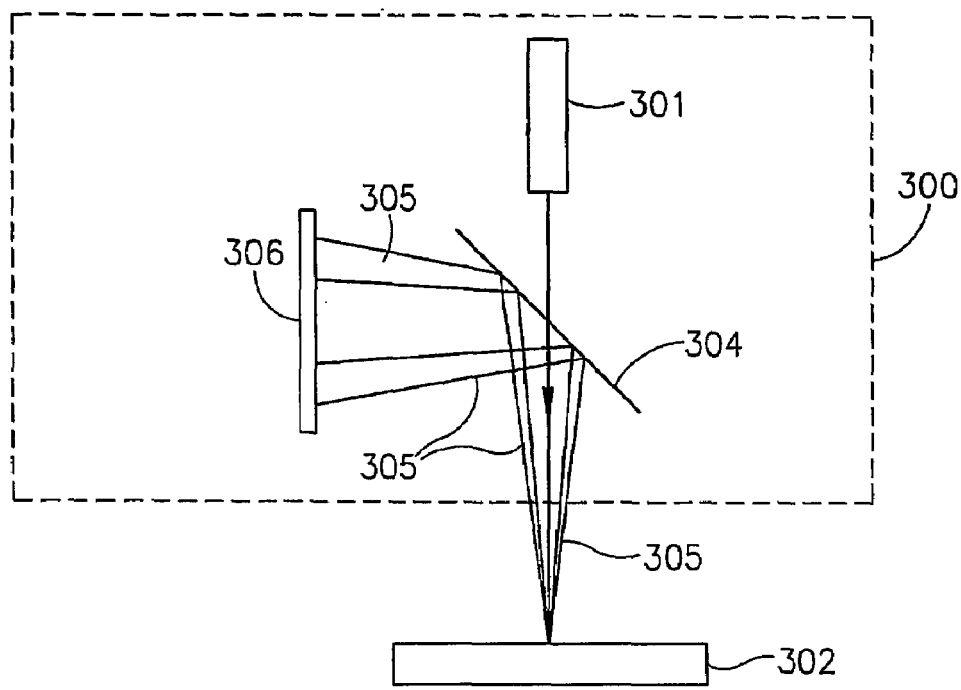
FIGS. 10A-10D show various authentication schemes, in accordance with embodiments of the invention.
Figure 10B:
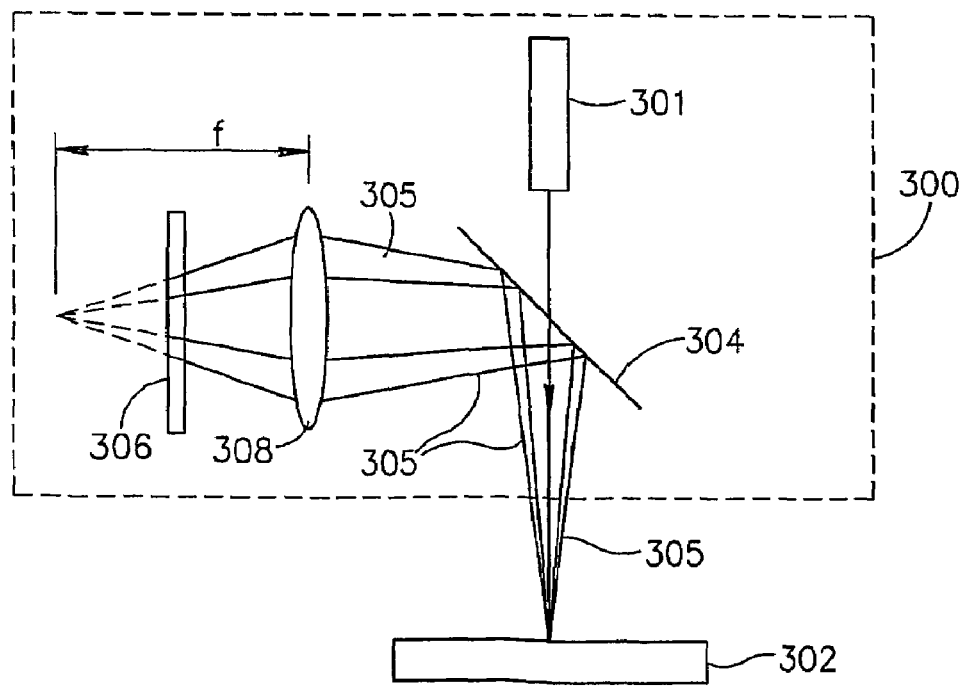

Another method of authentication is shown in FIGS. 10A and 10B. A small laser 301 illuminates a small portion of a retro-reflector 302 through a beam splitter 304. Light 305 is reflected from retro-reflector 302 and, after reflection from beam splitter 304 impinges on a imaging detector 306. This light forms an image on detector 306, which can be used to determine the conical angle $\alpha$. This serves to authenticate the card. The entire system may be contained in a hand held authenticator (as can those of FIGS. 10B-10D) indicated by a dashed line 300.

An alternative embodiment is shown in FIG. 10B In this case a lens 308 focuses the light reflected from the retro-reflector. Imaging detector 306 is placed at a predetermined position away from the focal plane of the lens, so that a ring of light is formed. If the distances are known, the conical angle can be determined.

Figure 10C:
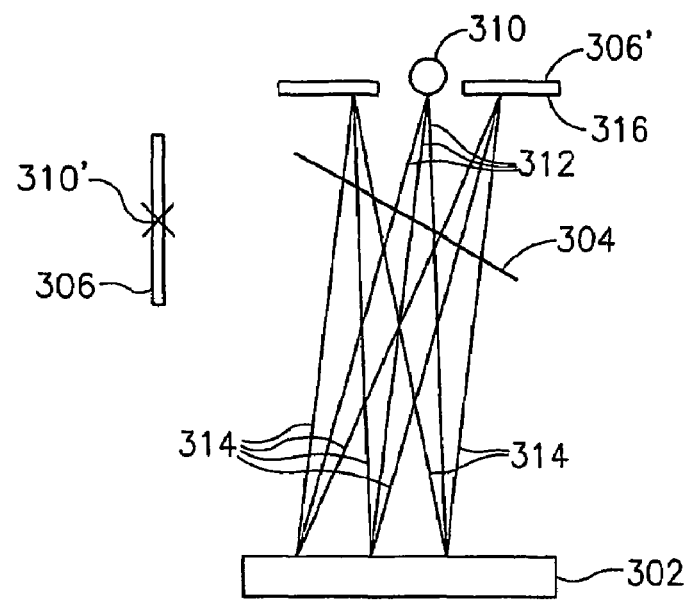

FIG. 10C shows an alternate authentication method, which does not require a laser and which can be used, at least in principle, at longer distances since aiming of the light onto the surface is not necessary. A small incoherent source, such as a LED 310 is used to illuminate the card. The beams 312 generated by the LED cause the retro-reflector to reflect conical reflected beams 314 from retro-reflector 302. For simplicity, the divergence of the retro-reflected beams is not shown. It is seen that a ring of light 316 is formed around source 310 (or around a virtual source 310', if beam splitter 304 is used). The formation of the light ring is shown around the source for ease of visualization and detector 306' can, in fact surround the source as shown (as it can in the embodiments of FIGS. 10A and 10B). Alternatively, it can view retro-reflector 302 via beam splitter 304.

Figure 10D:
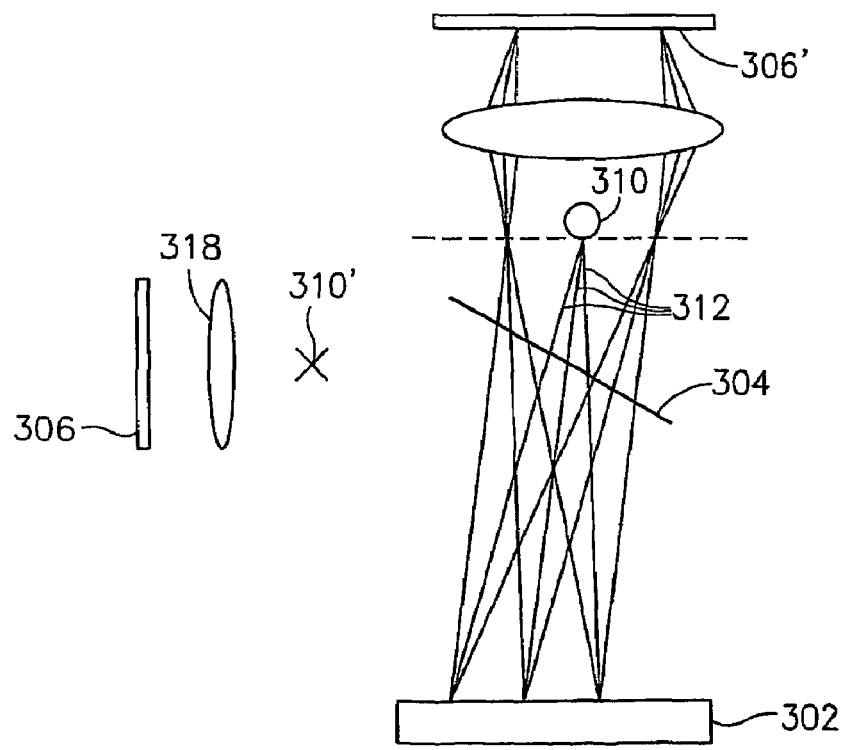

An alternative structure is shown in FIG. 10D. Since the ring of light is very nearly a real image, it can be focused by a lens 318 imaging the ring on the detector 306. As long as the ring angle and distance from the retro-reflector is such that the ring of light falls within the diameter of the lens, this method can be used.

It should be understood that the methods of FIGS. 10C and 10D provide a fuzzier ring than does the laser based system, due to the fact that not all the reflections converge on the same point. However, it can still give acceptable authentication.

It should be noted that the interrogators shown in FIGS. 10A-10D can be used on the same or a different portion of the card containing the indicta, and the retro-reflector used for this authentication can have a different conical angle than does the rest of the card. Use of a separate portion of the card for this feature is especially useful where the position of the card is fixed, as with close range applications. In addition, sections of the card having multiple circular offset angles (using for example, the method described above) can be used. The authentication can then measure a more complex and harder to forge pattern. Furthermore, if a simpler detector is desired a ring of small detectors or a ring detector can be used as a simple go/no-go test for an authentic card.

An authentication system for cards or any other material or product having indicta that are not retro-reflecting can be produced by making a small portion of the card retro-reflecting with a particular circular offset angle. Any of the methods illustrated in FIGS. 9A-10D can be used to authenticate the card. Alternatively, multiple areas can be formed with the retro-reflecting elements having a same or different circular offset angle. This makes the card harder to forge.

Image Processing

Figure 11:
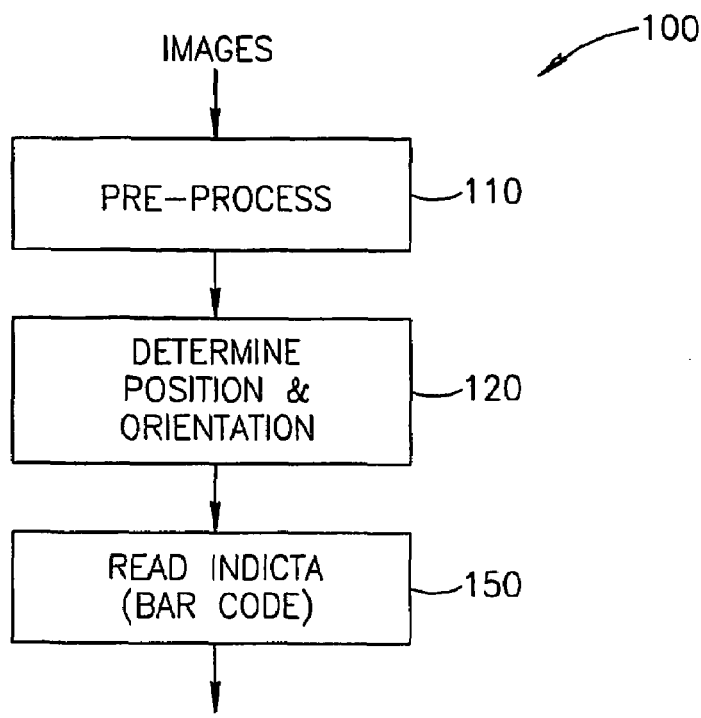
FIG. 11 shows a general block diagram of a method for extracting information from the indicta on a card, in accordance with an exemplary embodiment of the invention.

FIG. 11 shows a general block diagram of a method 100 for extracting information from the indicta on card 14, in accordance with an exemplary embodiment of the invention. In general, an image is acquired by a camera (or cameras, as described in the previous section and in the following section) at an illumination level that allows for proper reading of the indicta and extraction of the bar code information.

First, the image of the card and its surroundings is optionally pre-processed (110) to simplify the determination of information from the card. Next, the position and orientation of the card (if it is not in a fixed orientation) is determined (120). Next, the bar code, (or other indicta) is read (150).

Figure 12:
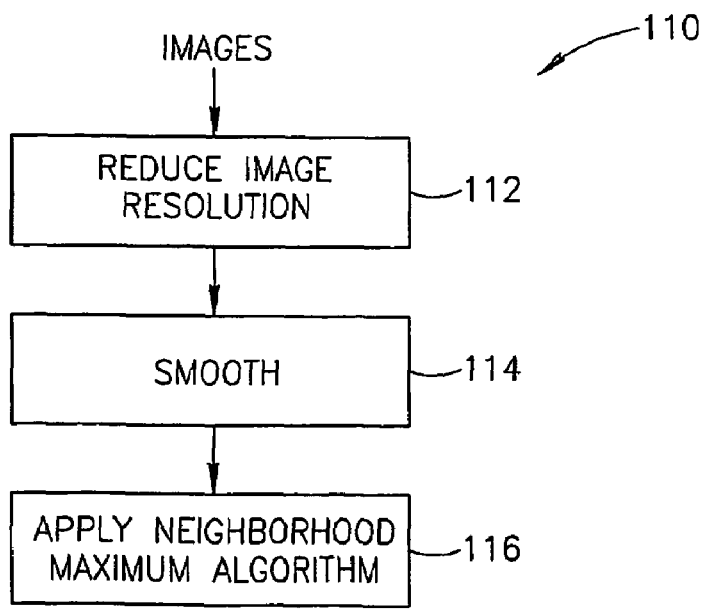
FIG. 12 is a block diagram showing some detail of a preprocessing algorithm, in accordance with an exemplary embodiment of the invention.

FIG. 12 is a block diagram showing some detail of a preprocessing algorithm (110), in accordance with an exemplary embodiment of the invention. First, the resolution of the image is reduced (112), so that the speed of the image processing needed for determining the position and orientation of the card is increased.

Then, the image is optionally smoothed (114) to reduce artifacts. A 2×2 or 3×3 uniform smoothing filter may be used, with the lower degree of filtering being used when the image resolution is reduced by a factor of 3 and the higher degree of filtering being used when the image resolution is reduced by a factor of 2. These values are representative and are not at all critical. Non-uniform smoothing (convolution) kernels can also be used.

Optionally, a neighborhood-maximum algorithm is applied to the image (116). This algorithm replaces the values of pixels by the value of a near neighbor having the highest value. This algorithm helps to reduce "holes" and non-uniformity in the image. It also substantially replaces the black lines in the code by white values making the detection of the card simpler.

Figure 13:
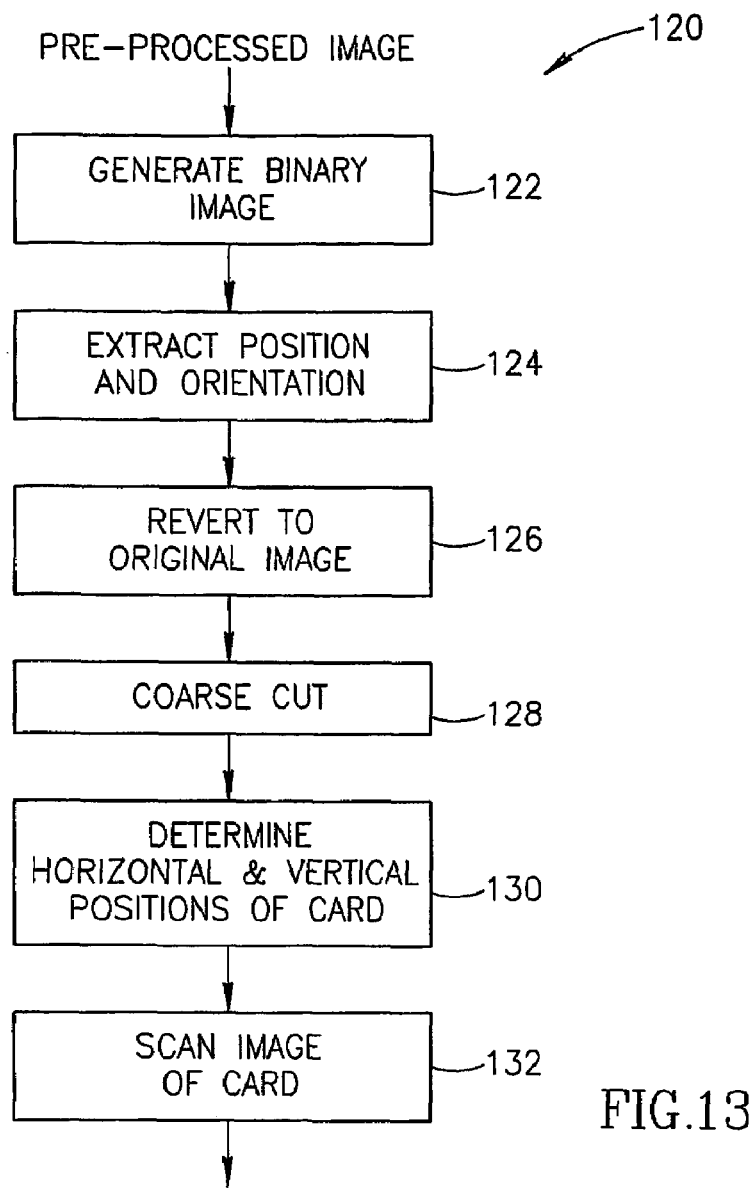
FIG. 13 shows a breakdown of the acts involved in an exemplary method for detecting the presence and position of a retro-reflecting card in the image, in accordance with an embodiment of the invention.

FIG. 13 shows a breakdown of the acts involved in an exemplary method (120) for detecting the presence and position of a retro-reflecting card in the image, in accordance with an embodiment of the invention. First, a binary image is generated (122) at a threshold that will clearly differentiate the card from its surroundings. Then, the position, tilt and size of the retro-reflecting card are extracted (124) from the image. Since the aspect of the card is not generally normal to the interrogating beam/camera, the card appears as a rhombus in the image. So also the aspect can be extracted, if desired, especially as the aspect ratio of the card is known.

Once the position and orientation of the image of the card are determined, the method reverts (126) to the originally acquired image for the rest of the algorithm. Optionally, image is "coarse cut" (128) to orient the card in Cartesian coordinates (taking note of the fact that the card may not appear rectangular) and removing the portions of the image that are not associated with the card itself. In some embodiments of the invention, the image is warped to fit a rectangle of the known width to height ratio. Then, the exact horizontal and vertical position of the card is determined (130). This determination is aided by aforementioned borders 50 and 52. In the absence of such borders, which are optional, the exact extent of the card can be determined from the transition between the very bright edge of the card and the relatively much darker background.

The rest of the image (other than the card itself) may be substantially black if, for example, the illumination is pulsed and the shutter of the camera is synchronized with the illumination. In some cases, is desirable to have some information about the surroundings of the card. In such cases, the rest of the image is "gray". In general, the algorithms given below are capable of extracting the position and orientation of the card from the background of a gray image.

The grayness of the image can be removed and the contrast of the image enhanced, in accordance with an embodiment of the invention, by acquiring, in addition to the retro-reflected image a second image, an image at a non-retro angle (hereinafter a "background" image). Preferably, the images are acquired at the same wavelength. The additional image is very similar the main image, except that the retro-reflected indicta and background is not present. The background image is subtracted from the main image, which leaves only the effects of retro-reflected portion of the image. This subtracted image can be used for either or both determination of the position and orientation and the reading of the bar code. An edge removing filter can be used after this operation to remove lines created by the slightly different angle of viewing.

The image of the card is then "scanned" to determine the positions (132) of the bar codes (hereinafter "stacks") and the spaces between the bar codes. Optionally, this is done by determining the average intensity for each of the lines of pixels along the larger dimension of the card. The lines with bar coding will have a much lower average intensity. As indicated above, when the spacing between the lines is not the same, the different spacing measurements allows for the determination of which side is the "up" side of the card. Alternatively, the up side of the card can be determined after the card is read, but before decoding of the information. Additionally or alternatively, spaces between characters are different on the two outermost rows. The top and bottom of the card can be determined from these spacings.

Other markers (such as circles in predetermined positions) can also be used to orient the cards.

Figure 14:
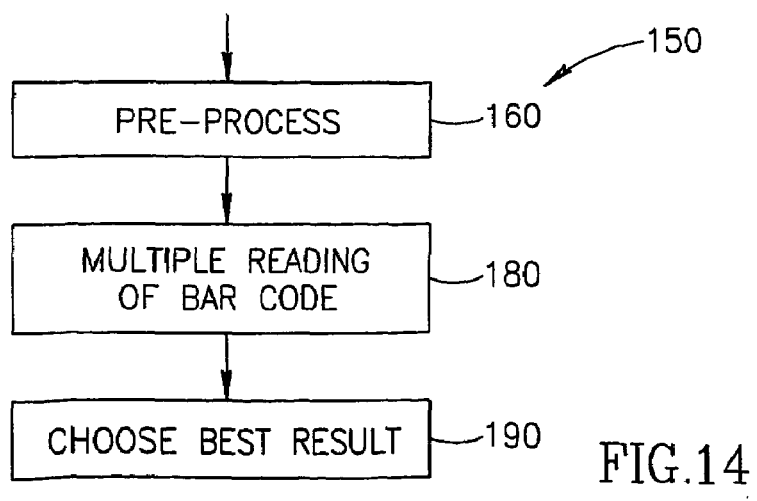
FIG. 14 is a summary flow chart of an exemplary algorithm for the reading a bar code on a card, in accordance with an embodiment of the invention.

FIG. 14 is a summary flow chart of an exemplary algorithm (150) for reading bar code 59 on card 14, in accordance with an embodiment of the invention.

In accordance with some embodiments of the invention, one or more pre-processing functions are applied (160) to the image prior to reading. In accordance with some embodiments, a bar code is read using more than one set of parameters (180). The "best" result is then chosen (190) using one or more criteria.

Figure 15:
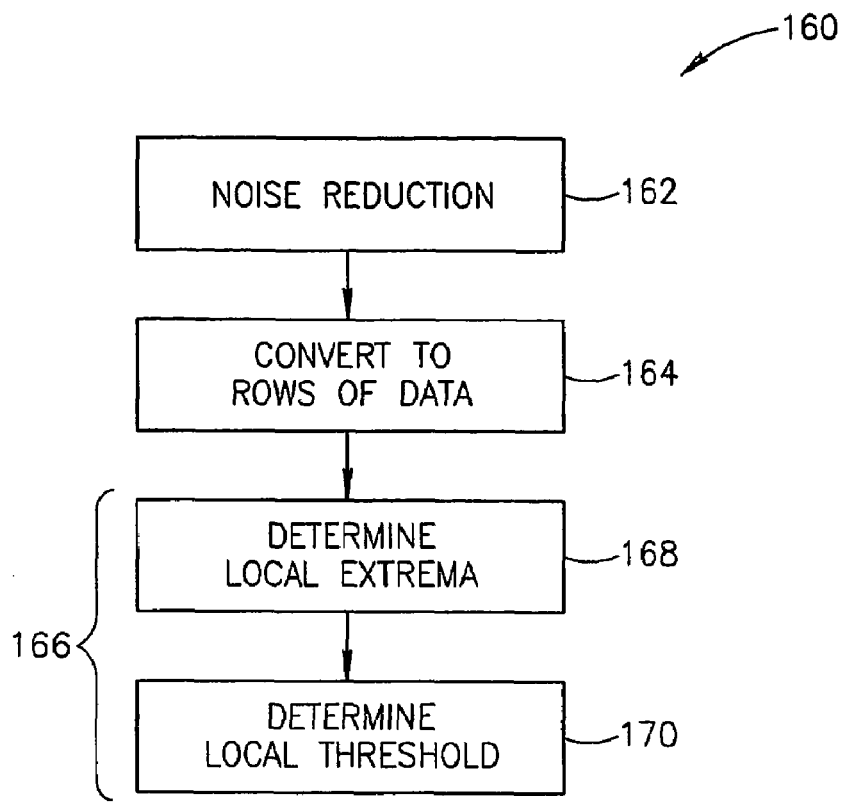
FIG. 15 is amore detailed flow chart of pre-processing of the image, in accordance with an exemplary embodiment of the invention.

FIG. 15 is a more detailed flow chart of pre-processing of the image, in accordance with an exemplary embodiment of the invention (160).

The image is also optionally noise-reduced (162), for example, using a median filter, since this filter does not substantially change the resolution of the image. The size of the kernel for the median filter is determined based on the width of the narrow lines of the code, as estimated by the size of the image of the card. Generally, the kernel size should be slightly smaller than the width of the line. This may improve the image for reading. Sometimes, however, it makes it worse. The reading of the data may be performed on each of the noise reduced and unprocessed images (each of which is further converted into rows of data as described in the following paragraph).

The stacks are converted into rows of data (164). Several methods may be employed, and, in some embodiments, more than one of these is tested (as for example at 180 of FIG. 14). One variation present in these methods is basing the data row on different parts of the stack height (i.e., the long dimension of the bar). For example, data rows may be generated based on the integral of the intensity along the height of the stack. Other sets of row data are generated, for example, using the top, bottom or middle 10% of the bar height (each conveniently about 1 pixel high) or on the integral over the middle 50% of the height of the stack. Utilizing a number of different portions of the stack is desirable, especially in the presence of noise, blurring, glare, obstruction or other localized interference. Generally, if noise reduction is also performed, eight candidate data sets are generated. Alternative rows of data may be generated by reading from right to left as well as from left to right. The code starts from a white area. Rarely, the image is not cut correctly and the reading from one side gives an incorrect result, while the reading from the other end is correct.

The rows of data are then binarized (166). Due to the large variations in intensity that are possible in actual situations, the application of a fixed threshold for determining the transition from black to white lines is generally, but not always inappropriate. In some embodiments of the invention, the values of intensity on the bar code portion of the image are normalized using the intensity values on the bright and dark border portions of the image. These can be used to reduce the effect of global intensity parameters such as glare, weather, illumination variations and aspect angle. Various methods for flattening the background, as known in the art of image processing, may also be used.

In accordance with an embodiment of the invention, binarization comprises two parts. The first of these is the determination of the local extrema of the row of data (168). Extrema (a minimum, for example) may be determined by comparing the value of each element in the row of data with the next element. The maximum (for instance) is defined as the first point where the value is larger than the next point, and larger than a statistical value determined from the gray levels of the code.

Similar criteria apply for determining relative minimum.

After determining the local minima and maxima, a local threshold, for the range between a particular minimum and maximum is set (170) half way between the adjacent minimum and maximum. The row of data is then binarized using this threshold. Other methods of determining a threshold can be used, for example, using a local threshold between every two bars in a character rather than a same threshold for the entire line.

Figure 16:
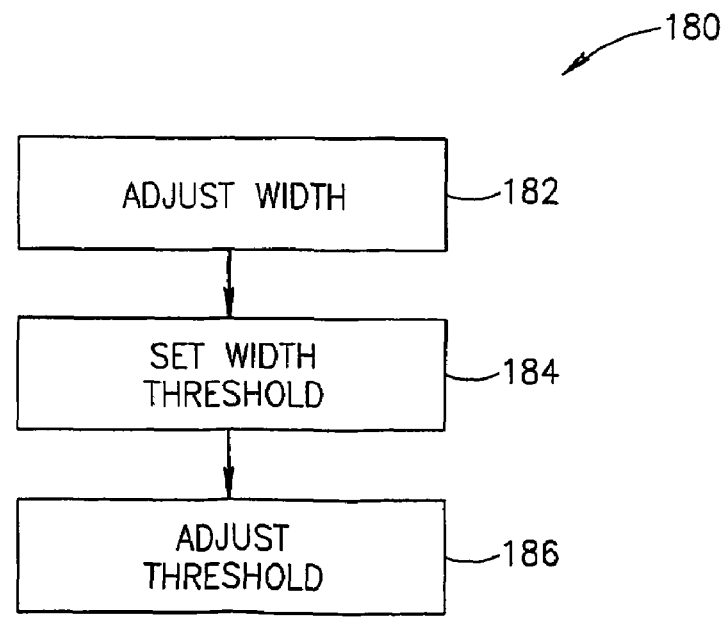
FIG. 16 is a flow chart of an exemplary method of reading of the bar code, in accordance with an embodiment of the invention.

FIG. 16 is a general flow chart of an exemplary method (180) of reading of the bar code, in accordance with an embodiment of the invention. This method includes two main portions, adjusting the widths (182), setting a threshold for wide and narrow lines (184) and adjusting the threshold until a "good" code, i.e., one that meets criteria for a code 39s, is achieved (186).

As to adjusting the widths (182), in an embodiment of the invention, after the widths are found, the widths are adjusted based on the "energy" (i.e. the integral of the intensity difference from a central value) in each bar. For example, in some situations, blurring may not be uniform across the field of view, or different bars bay be differently situated with respect to the pixels. Under such conditions, the some bars may appear to be wider or narrower than others. However, widening the bars causes a decrease in the intensity of the pixels. However, the energy is substantially conserved. Thus, the energy can be used to correct the measured width, for example, when the energy is lower than a normative value, the width is reduce. Alternatively, the energy itself can be used to define the width of the bars.

Empirically, a bar situated between two wide bars is imaged as being wider than it actually is, especially if blurring exists. In an embodiment of the invention, the width of a bar is reduced by one pixel, if it is situated between two wide bars. It is understood that these corrections are empirical and may not be necessary in some practical embodiments of the invention. Furthermore, other empirical corrections may be necessary. Alternatively or additionally, the system may be calibrated to recognize and adjust the values of some standard patterns.

The determination of whether a line is wide or narrow is determined by arranging the widths of the nine elements in the character in order of length. Each set has three wide bars and six narrow bars, so that the three widest bars are determined to be wide and the other six are determined to be narrow.

The "best" decode is chosen. First invalid groups (those with more than or fewer than 9 lines, for example) are rejected. The best decode may be defined as the most common character (among the multiple outputs that correspond to the same physical character). In addition an alternate code is chosen, namely, the second most common code, where at least two codes have the same output value.

Since characters are repeated, the actual character value is chosen as the value that appears the most times, among the best code and alternate codes for all of the repeats of the character.

It is clear that, in some embodiments of the invention, other methods of determining a best choice of character can be used.

It will be clear that the present application describes a number of different elements, including, inter alia a card having one of several novel retro-reflectors, a novel code, novel methods of determining the position and orientation of a target, such as a card, novel methods of reading a code, novel apparatus for acquiring images of a card and various security measures that are novel. It should be clear that many of these novel elements can be utilized, in some embodiments of the invention, without any of (and certainly without all of) the others.

Figure 17:
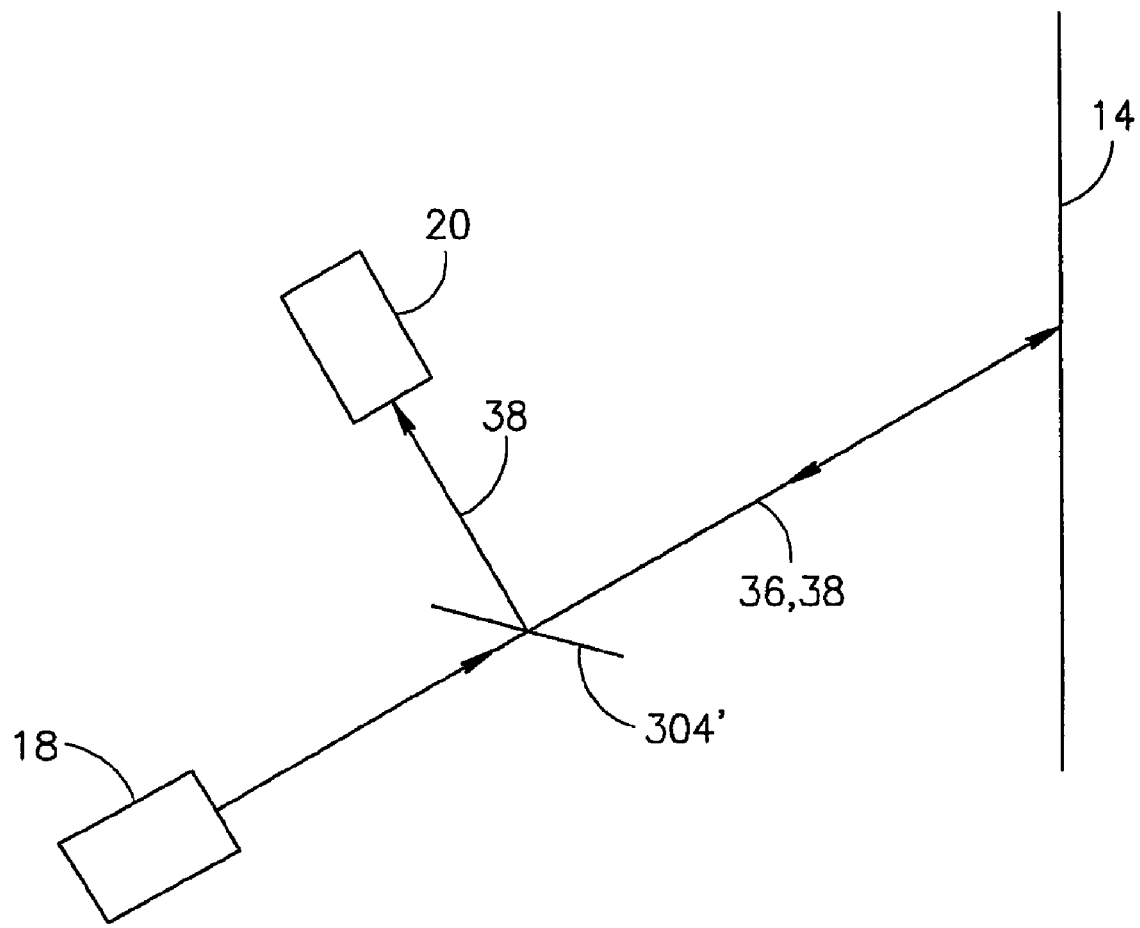
FIG. 17 is a schematic layout of an alternative system for vehicle identification, according to an embodiment of the invention.

For one example, the reader is referred to FIG. 17, in which a standard type retro-reflector is used, in which there is no offset angle. A code, as described above may optionally be used. A beam splitter 304' may be used to direct the reflected beam to camera 20. Optionally, the source produces linearly polarized light. A quarter wave plate is placed on the indicta, so that no light is returned to the source from the retro-reflector.

Furthermore, while the invention has been explained in detail, mainly in the context of a card for distance viewing in a vehicle, objects utilizing one or more aspects or features of the present invention can also be utilized for credit card, smart cards, EM smart cards, personal access control card. The present invention is also applicable to authentication labels for products, for stock control and for any other uses for which cards and stickers are used. While the invention is described for use with a card, the form of the retro-reflector can be a sticker, (either rigid or flexible) or can be formed directly on any other surface.

Furthermore, while the card has been described with the characters stacked two to a stack in rows that are parallel to the long side of the card, the characters may be stacked in the direction of the long side such that the characters run in a direction parallel to the short end. Furthermore, while the invention has been illustrated utilizing a modified code 39, an unmodified code 39, two dimensional codes and other forms of indicta may be formed on the cards and read, in accordance with various embodiments of the invention.

An appendix attached to a US Provisional application entitled ELECTRO-OPTIC READERS and filed on the same day as the present PCT application contains source code for performing the image processing part of the present invention. This provisional application is incorporated herein by reference.

It will thus be clear, the present invention has been described using non-limiting detailed descriptions of exemplary embodiments thereof that are provided by way of example and that are not intended to limit the scope of the invention. Variations of embodiments of the invention, including combinations of features from the various embodiments will occur to persons of the art. The scope of the invention is thus limited only by the scope of the claims. Furthermore, to avoid any question regarding the scope of the claims, where the terms "comprise," "comprising," "include," "including" or the like are used in the claims, they mean "including but not necessarily limited to".

The invention claimed is:

1. A system for identification comprising:
a surface comprising retro-reflective indicta;
a source of light that illuminates the indicta along an illumination direction; and
a detector that views light reflected from the indicta,
wherein the retro-reflective indicta reflects the light that illuminates the indicta as a plurality of beams at a plurality of angles relative to the illumination direction, and the plurality of beams provides a substantially continuous ring of reflected light.

2. A system according to claim 1 wherein the plurality of beams lie on the surface of a circular or elliptical cone.

3. A system according to claim 1 wherein the ring of light has substantially the same intensity along the circumference of the ring.

4. A system according to claim 1 wherein the source illuminates and the detector views the surface at angles having a difference substantially equal to at least one of the plurality of angles.

5. A system according to claim 4, wherein the detector is an imaging detector, that forms an image of the light retro-reflected from the surface.

6. A system according to claim 5 wherein the source of light does not scan the surface.

7. A system according to claim 5, wherein the imaging detector images a field of view that has an area at least 5 times as large as the area of the surface.

8. A system according to claim 7 wherein the imaging detector images a field of view that has an area at least 20 times as large as the area of the surface.

9. A system according to claim 8 wherein the imaging detector images a field of view that has an area at least 100 times as large as the area of the surface.

10. A system according to claim 5 and including an image processor that detects the presence of the surface in an image acquired by the imaging detector, wherein the retro-reflecting surface reflects light that forms an information carrying image and wherein the image processing circuitry is operative to extract the information from the image.

11. A system according to claim 10 wherein the information carrying image comprises a bar code.

12. A system according to claim 10 wherein the information carrying image comprises a two dimensional code.

13. A system according to claim 10 wherein the information comprises spectral information.

14. A system according to claim 1 wherein the plurality of beams provides two or more substantially continuous rings of reflected light.

15. A system according to claim 1 wherein the source of light illuminates the surface with incoherent light.

16. A system according claim 1, wherein the source illuminates and the detector views the surface at substantially the same angle.

17. A system according to claim 16 wherein the detector is an imaging detector.

18. A system according to claim 16 and including authentication circuitry which authenticates the surface when the detector detects a predetermined pattern of light.

19. A system according to claim 16 and including a reflector that reflects the light reflected by the retro-reflector so that the light reflected by the reflector can be viewed outside the path of illumination.

20. A system according to claim 19 wherein the detector is situated at the plane of the source or at a virtual plane of the source or at an image of said source plane or virtual source plane.

21. A system according to claim 16 wherein the light source is a laser.

22. A system according to claim 21 wherein the detector views the light reflected by the retro-reflector without any focusing of the reflected light.

23. A system according to claim 21 and including a focusing element, having a focal length, that receives the light reflected by the retro-reflector, wherein the detector is placed in the path of the thus reflected beam, spaced from the focusing element by a distance other than the focal length.

24. A system according to claim 1, wherein the detector is an imaging detector, that forms an image of the light retro-reflected from the surface.

25. A system according to claim 24 wherein the source of light does not scan the surface.

26. A system according to claim 24, wherein the imaging detector images a field of view that has an area at least 5 times as large as the area of the surface.

27. A system according to claim 24 wherein the imaging detector images a field of view that has an area at least 100 times as large as the area of the surface.

28. A system according to claim 24 and including an image processor that detects the presence of the surface in an image acquired by the imaging detector, wherein the retro-reflecting surface reflects light that forms an information carrying image and wherein the image processing circuitry is operative to extract the information from the image.

29. A system for identification comprising:
a surface comprising retro-reflective indicta;
a source of light that illuminates the indicta along an illumination direction; and
an imaging detector that views light reflected from the Indicta, said light forming an image on the imaging detector,
wherein the retro-reflective indicta reflects the light that illuminates the indicta as a plurality of beams at a plurality of angles relative to the illumination direction, wherein the source illuminates and the detector views the surface at substantially the same angle, and wherein the image on the imaging detector comprises a pattern corresponding to the angles at which the light is reflected.

30. A retro-reflective surface having information encoded thereon by having different retro-reflecting areas thereof retro-reflecting with different retro-reflective intensities, to form indicta carrying the information, wherein the retro-reflecting surface reflects the light that illuminates the indicta as a plurality of beams at a plurality of angles to the illumination direction.

31. A surface according to claim 30 wherein the information is comprised in a two-dimensional code.

32. A surface according to claim 30 wherein the information is comprised in a bar code.

33. A surface according to claim 32 wherein the bar code is a stacked one-dimensional code.

34. A retro-reflective surface having information encoded thereon by having different areas thereof retro-reflecting with different, retro-reflective intensities, to form indicta carrying the information, wherein the retro-reflecting surface reflects the light that Illuminates the indicta as a plurality of beams at a plurality of angles to the illumination direction;
wherein the plurality of beams lie on the surface of a circular or elliptical cone.

35. A retro-reflective surface having information encoded thereon by having different areas thereof retro-reflecting with different retro-reflective intensities, to form indicta carrying the information, wherein the retro-reflecting surface reflects the light that illuminates the indicta as a plurality of beams at a plurality of angles to the illumination direction;
wherein the plurality of beams provide a substantially continuous ring of reflected light when illuminated by a beam of light.

36. A retro-reflective surface having information encoded thereon by having different areas thereof retro-reflecting with different retro-reflective intensities, to form indicta carrying the information, wherein the retro-reflecting surface reflects the light that illuminates the indicta as a plurality of beams at a plurality of angles to the illumination direction;
wherein the plurality of beams define the surface of two or more circular or elliptical cones.

* * * * *

UNITED STATES PATENT AND TRADEMARK OFFICE
CERTIFICATE OF CORRECTION

| | | |
|---|---|---|
| PATENT NO. | : 7,273,176 B2 | Page 1 of 1 |
| APPLICATION NO. | : 10/486992 | |
| DATED | : September 25, 2007 | |
| INVENTOR(S) | : Naftali P. Eisenberg et al. | |

It is certified that error appears in the above-identified patent and that said Letters Patent is hereby corrected as shown below:

On the Title page, insert in the section marked

[75]    Inventors:

--Tal VERKER, Ofra (IL)--

Signed and Sealed this

Eighteenth Day of November, 2008

JON W. DUDAS
*Director of the United States Patent and Trademark Office*